US005495276A

United States Patent [19]

Mul et al.

[11] Patent Number: 5,495,276

[45] Date of Patent: Feb. 27, 1996

[54] UNIFORM MEDIA TENSIONING OF PRINT MEDIA DURING TRANSPORT IN LASER PRINTER

[75] Inventors: Paul K. Mul, Boise; John W. Huffman, Meridian, both of Id.

[73] Assignee: Hewlett-Packard Company, Palo Alto, Calif.

[21] Appl. No.: 229,412

[22] Filed: Apr. 18, 1994

[51] Int. Cl.[6] .......................... H04N 1/12

[52] U.S. Cl. .......................... 347/164; 347/153

[58] Field of Search .......................... 346/108, 76 L, 346/160; 271/3, 19, 21; 347/164, 153

[56] References Cited

U.S. PATENT DOCUMENTS 4,307,408 12/1981 Kiyohara et al. .......................... 346/76 L

*Primary Examiner*—Benjamin R. Fuller
*Assistant Examiner*—Raquel Yvette Gordon
*Attorney, Agent, or Firm*—Anthony J. Baca

[57] ABSTRACT

There is provided an arrangement within an electrophotographic printer that helps reduce deformation in the media by ensuring that the media remains under a constant tension. The arrangement uses a first roller for moving the media through the electrophotographic printer at a given linear velocity. A second roller, placed after the first roller, also moves the media through the electrophotographic printer. However, the second roller has a variable linear velocity, where the variable linear velocity having a maximum linear velocity that is greater than the first roller's linear velocity. Power is applied to the second roller through a clutch. When the maximum amount of power is being applied to the second roller, the clutch limits the variable linear velocity to that of the first roller's linear velocity. Thus, the clutch limits the variable velocity when the media is under a known tension, wherein the known tension is constant in the media while the media moves through the electrophotographic printer.

3 Claims, 3 Drawing Sheets

UNIFORM MEDIA TENSIONING OF PRINT MEDIA DURING TRANSPORT IN LASER PRINTER

TECHNICAL FIELD

This invention relates generally to electrophotographic printing also known as laser printing and more particularly to an improved media tensioning arrangement for use in a desktop type laser printer. This arrangement is useful to reduce curl and wave produced by these printers.

BACKGROUND OF THE INVENTION

In a typical laser printer the media transport system may compose five major areas: (1) Pickup; (2) Registration; (3) Imaging; (4) Fuser; and (5) Output. Each area uses one or more rollers to move the media through the area. The linear velocities of all the rollers in the gear train are designed to be the same so that media transport speeds are synchronized in all areas. However, because of manufacturing process, part tolerances, material differences and different wearing characteristics of the rollers and gear train, the linear velocities of the rollers vary to a certain extent. As a result, media deformation such as waves, crimp, curl, wrinkles, paper jams, and print quality can occur.

For example, if the output roller's linear velocity is slower than that of the fuser roller, the fuser roller will feed the output roller more media than the output roller can handle causing media to start backing up, buckling up and folding up at the exit area of the fuser. Because of the high temperature in the fuser, the media exiting from the fuser is still in plastic form. As a result, permanent waves or deformation are formed in the backed up, buckled up, or folded up portion of the media. This phenomenon is more pronounced as the length of the media increases from A size (11 inches long) to B size (17 inches long). Paper jams can also occur because of this phenomenon.

If the output roller's linear velocity is faster than the fuser roller, the output roller pulls more media than the fuser roller can feed. Under these circumstances, the media is stretched at the fuser exit area while it is still in plastic form. Again, media deformation occurs and print quality may also be affected; additionally, the media may also be torn.

SUMMARY OF THE INVENTION

In order to accomplish the present invention, there is provided an arrangement within an electrophotographic printer that helps reduce deformation in the media by ensuring that the media remains under a constant known tension. The arrangement uses a first roller for moving the media through the electrophotographic printer at a given linear velocity. A second roller, placed after the first roller, also moves the media through the electrophotographic printer. However, the second roller has a variable linear velocity, where the variable linear velocity has a maximum linear velocity that is greater than the first roller's linear velocity. Power is applied to the second roller through a clutch. When the maximum amount of power is being applied to the second roller, the clutch limits the variable linear velocity to that of the first roller's linear velocity. Thus, the clutch limits the variable velocity when the media is under a known tension, wherein the known tension is constant in the media while the media moves through the electrophotographic printer.

DETAILED DESCRIPTION OF THE PREFERRED EMBODIMENTS

Figure 1:
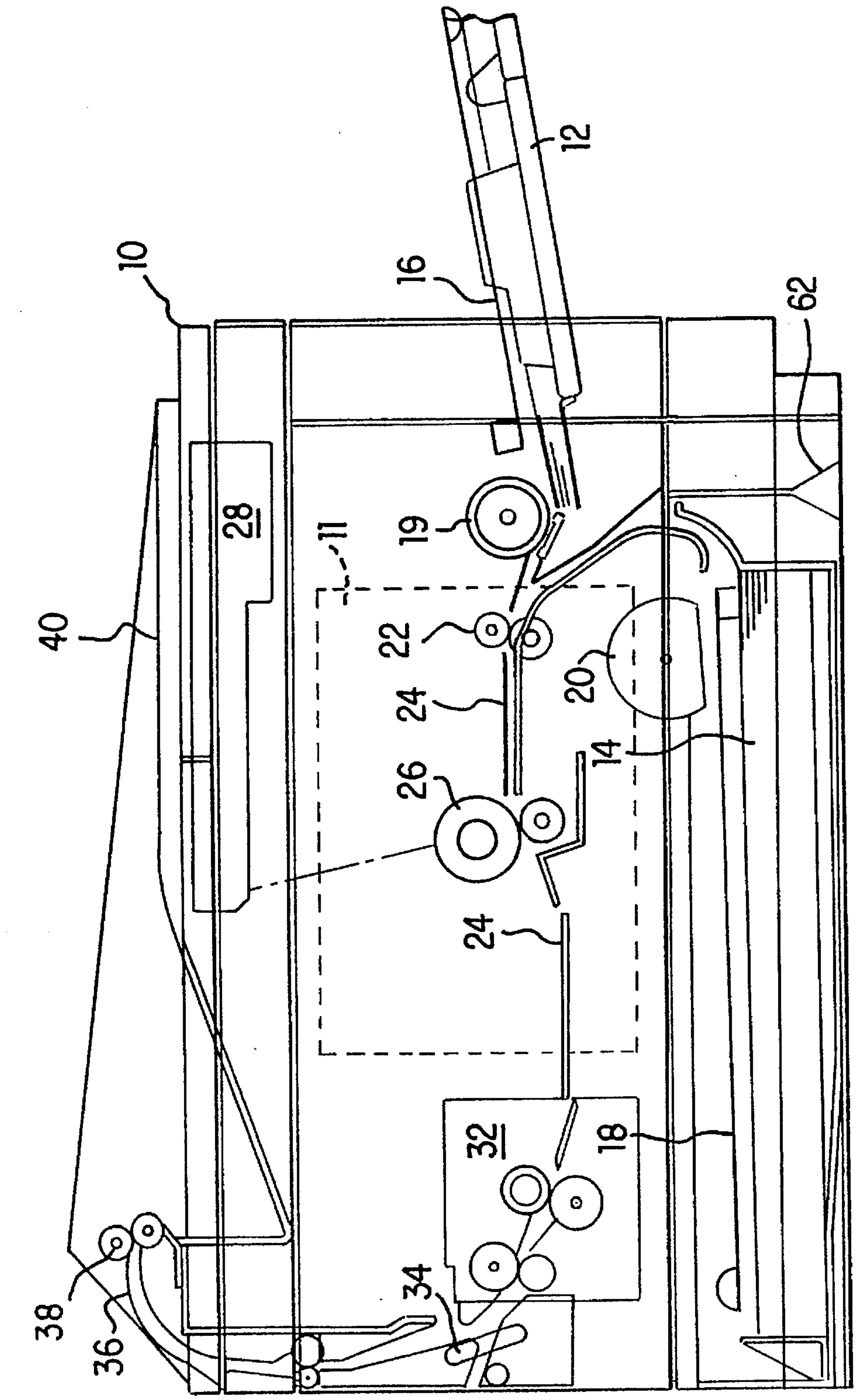
FIG. 1 is a cut away isometric view of an electrophotographic printer housing showing the paper path through the fuser in accordance with the present invention.

Referring first to FIG. 1, where a desk top laser printer 10 with a cutaway view is shown. One skilled in the art of electrophotographic printing will understand that this FIGURE is a simplified diagram used to orient the reader as to the function of the present invention.

As stated earlier, the printer is generally comprised of five areas, which are visible in FIG. 1. Generally, media starts in one of two separate pickup areas 19 or 20. The printer 10 picks up media 16 with roller 19 or media 18 with roller 20 depending on which source is designated by the printer 10. After the media is picked up, it passes through registration rollers 22. The registration area ensures proper positioning of the media prior to entering the imaging area 24. Once in the imaging area 24, as is known in the art of electrophotographic printing, an image is transferred from the photoconductive drum 26 to the media. With present technology laser printing systems, it is common practice to next pass the printed media, with the just printed text or graphics, into the fuser 32 to burn in, or fuse in, the text or graphics on the media. This eliminates the possibility of smearing the media thus enhancing the permanent nature of the generated document. The fuser is heated to a temperature of about 180 degrees Celsius. At this temperature, the toner liquefies thereby fusing to the media. After leaving the fuser 32, the media enters the output area 36 finally coming to rest in the output tray 40.

Figure 2:
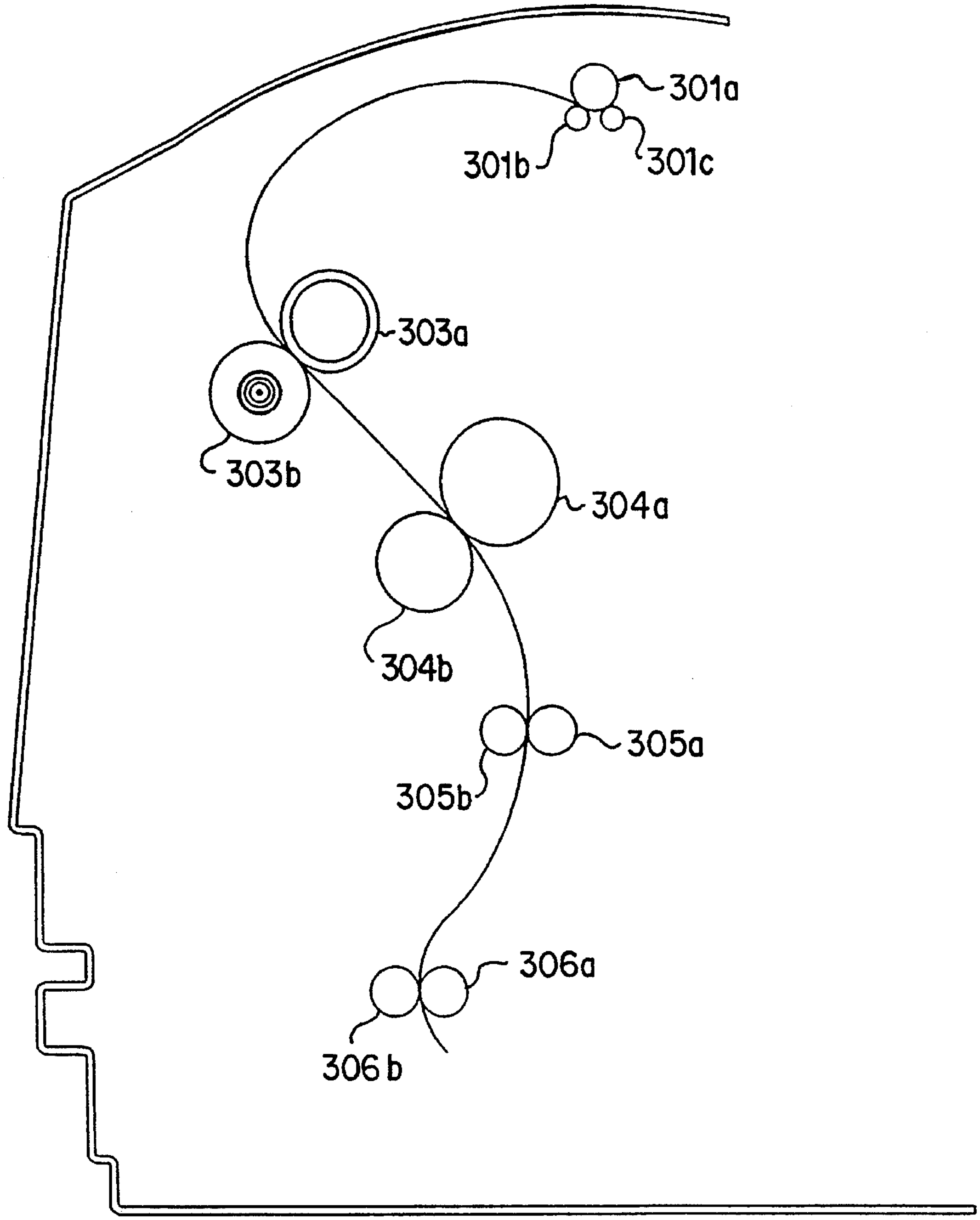
FIG. 2 shows a simplified paper path of an electrophotographic printer in accordance with the present invention.

FIG. 2 represents the paper path of FIG. 1 in a simplified diagram. Starting at the bottom of FIG. 2 media first enters paper pickup rollers **306*a* and 306*b*. From there it is transported to registration rollers 305*a* and 305*b*. Media then passes through imaging rollers 304*a* and 304*b*, fuser rollers 303*a* and 303*b* and finally output section rollers 301*a*, 301*b*, and 301*c***. As stated earlier each one of the rollers in the individual areas must transport the media at the same linear velocity. If any one roller or area exhibits a different linear velocity the media will either be stretched or folded depending upon whether the linear velocity is higher or lower respectively.

The present invention can be applied anywhere from the pickup roller in the input area to the output roller in the output area. For simplicity and consistency, the path between the fuser rollers and output rollers will be used to illustrate a preferred embodiment.

Figure 3:
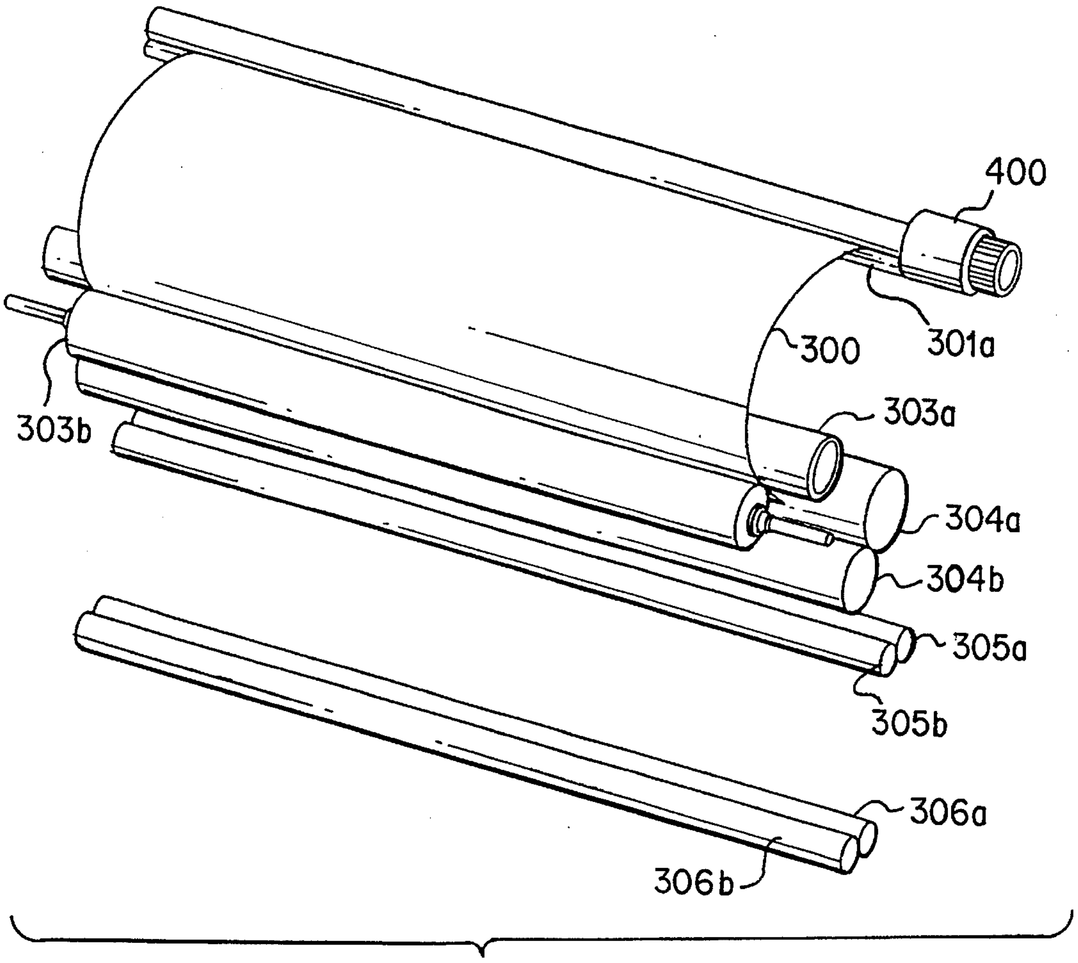
FIG. 3 uses the simplified paper path of FIG. 2 to show an embodiment in accordance with the present invention.

FIG. 3 shows a preferred embodiment of the present invention. Not readily evident from FIG. 3, output roller **301*a* has a faster linear velocity than fuser rollers 303*a* and 303*b*. To compensate for this faster linear velocity, output roller 301*a* incorporates a slip clutch 400. As the media 300 is pulled by output roller 301*a* the tension increases. At a predetermined tension, the slip clutch 400 on output roller 301*a* begins to slip. As a result of the slip, media 300 experiences a uniform tension. The slip clutch 400** can be a friction, hydraulic, magnetic or any other type of slip clutch.

The exact embodiment of the slip clutch is not important to the present invention.

For media 300 to remain under a uniform and constant tension, the paper path between fuser 303*a* and 303*b* and output roller 301*a* must be constant. This requirement is not shown in FIG. 3 but can be seen in FIG. 1.

It should be apparent to one skilled in the art that if the paper path is curved in shape, it is desirable that the newly printed image on media 300 face toward the convex side of the paper path. This arrangement ensures that the paper path does not smear the newly printed image on media 300. If the paper path is a simple straight line between the two rollers and no paper guide is used, then the orientation of the media is not important.

As stated earlier the present invention can be used for any pair of rollers. However, in a typical electrophotography printer, as the media 300 exits the fuser rollers 303*a* and 303*b* the toner is still in a liquid state as a result of the high temperatures used in the fuser roller 303*a*; the media is also at an elevated temperature. This high temperature, for both toner and media, tends to leave the media in a plastic state. As a result, the media is more susceptible to buckling and stretching. Thus, the present invention is most effective when used between fuser 303 and output roller 301*a*.

In summary, the preferred embodiment uses a second roller with a faster linear velocity than a previous roller where the faster roller incorporates a slip clutch mechanism. As the media is pulled into the second roller, the clutch will slip at a predetermined tension maintaining a uniform media tension. With uniform media tension during transport, many potential media deformations and jams can be minimized thereby increasing the quality of the printed media.

Although the preferred embodiment of the invention has been illustrated, and that form described, it is readily apparent to those skilled in the art that various modifications may be made therein without departing from the spirit of the invention or from the scope of the appended claims.

What is claimed is:

1. An apparatus operated within an electrophotographic device for reducing deformation in a media, said apparatus comprising of:

a first roller pair for moving said media through said electrophotographic device, said first roller pair moving said media at a first linear velocity;

a second roller pair for moving said media through said electrophotographic device, said second roller pair moving said media at a variable linear velocity where said variable linear velocity having a maximum velocity that is greater than said first linear velocity; and a clutch for applying a maximum amount of power to said second roller pair, when said maximum amount of power is being applied to said second roller pair, said clutch limits said variable linear velocity to that of said first linear velocity.

2. An apparatus as claimed in claim 1 wherein said clutch limits said variable velocity when said media is simultaneously in contact with said first roller pair and said second roller pair thereby placing said media under a known tension.

3. An apparatus operated within an electrophotographic device for reducing deformation in a media, said apparatus comprising:

a first moving means for moving said media through said electrophotographic device, said first moving means moving said media at a first linear velocity;

a second moving means for moving said media through said electrophotographic device, said second moving means moving said media at a variable linear velocity where said variable linear velocity having a maximum linear velocity that is greater than said first linear velocity; and a transfer means for .applying power to said second moving means, said transfer means allowing a maximum amount of power to be applied to said second moving means furthermore wherein said transfer means limits said variable linear velocity to that of said first linear velocity, when said maximum amount of power is being applied to said second moving means.

* * * * *

UNITED STATES PATENT AND TRADEMARK OFFICE
CERTIFICATE OF CORRECTION

PATENT NO. : 5,495,276
DATED : February 27, 1996
INVENTOR(S) : Paul K. Mui et al It is certified that error appears in the above-identified patent and that said Letters Patent is hereby corrected as shown below:

On the title page, items [19] and [75]:
line Inventors, replace "Mul", with --Mui--.

Signed and Sealed this

Thirteenth Day of October 1998

*Attest:*

BRUCE LEHMAN

*Attesting Officer*

*Commissioner of Patents and Trademarks*